United States Patent [19]

Shpigel

[11] Patent Number: 4,976,468
[45] Date of Patent: Dec. 11, 1990

[54] CONNECTIVE JOINT WITH INTERLOCKING RING STRUCTURES, ADAPTABLE FOR WATER CONDUCTION

[75] Inventor: Vladimir Shpigel, Brooklyn, N.Y.
[73] Assignee: Amrus Corporation, New York, N.Y.
[21] Appl. No.: 373,997
[22] Filed: Jun. 29, 1989

Related U.S. Application Data

[62] Division of Ser. No. 59,966, Jun. 9, 1987, Pat. No. 4,845,603.

[51] Int. Cl.⁵ .............................................. B05B 15/08
[52] U.S. Cl. .................................... 239/587; 285/184
[58] Field of Search ............... 239/227, 281, 587, 590; 169/25; 285/184, 271, 282

[56] References Cited

U.S. PATENT DOCUMENTS

| | | | |
|---|---|---|---|
| 992,193 | 5/1911 | Hart | 169/25 X |
| 3,685,745 | 8/1972 | Peschcke-Koedt | 239/587 |
| 4,007,793 | 2/1977 | Hux et al. | 239/587 X |

Primary Examiner—Andres Kashnikow
Assistant Examiner—Kevin Weldon
Attorney, Agent, or Firm—Ashen Martin Seldon Lippman & Scillieri

[57] ABSTRACT

This fluid-current-transmitting mechanical joint allows relative rotation of two articles (one may be a stationary fixture), on an arbitrary axis. The joint has as much angular-rotation range as a hinge, but as many degrees of freedom as a ball-and-socket or universal joint. The invention has a dual outer structure consisting of two interlocked bodies, each generally arched and generally surrounding an aperture, with a connection point on each body for attachment of one of the articles; and a dual inner structure of two mutually fixed, interlocked rings or the like. The two bodies of the outer structure can be generally ring-shaped and if desired can take the form of two closely interlocked toroids, the minor cross-section of each toroid being sized to just fit through the central aperture of the other. These outer-structure bodies ride on the inner structure. The internal structure may be effectively concealed, but its inner rings provide—via a common area where they are joined—paths for transmitting the fluid current between the articles.

12 Claims, 8 Drawing Sheets

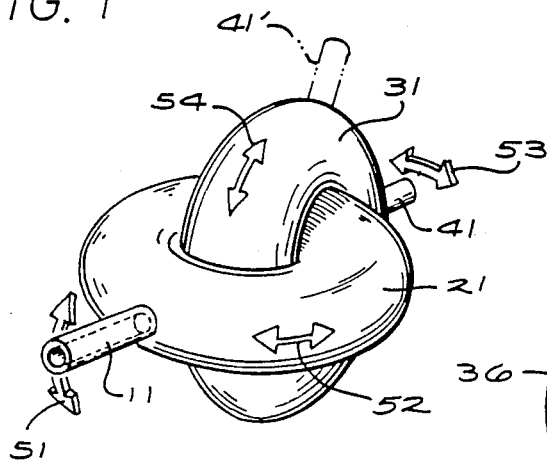
FIG. 1
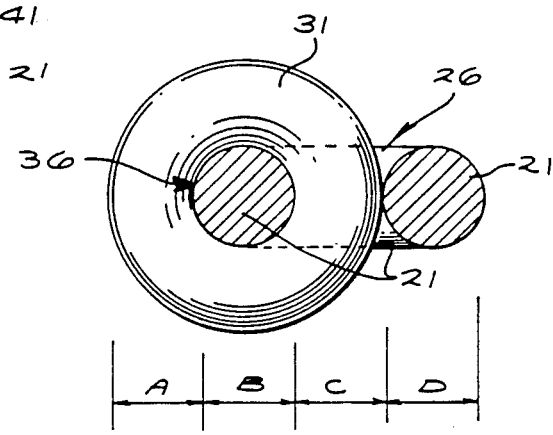
FIG. 2
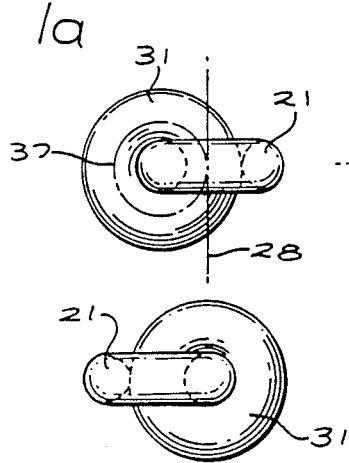
FIG. 1a
FIG. 1c
FIG. 1b
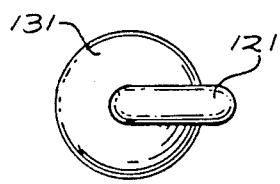
FIG. 3
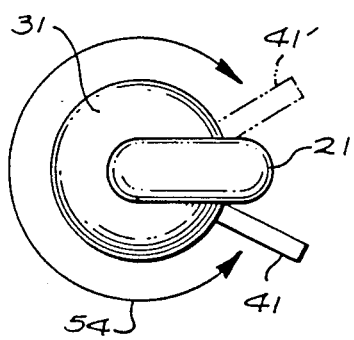
FIG. 4

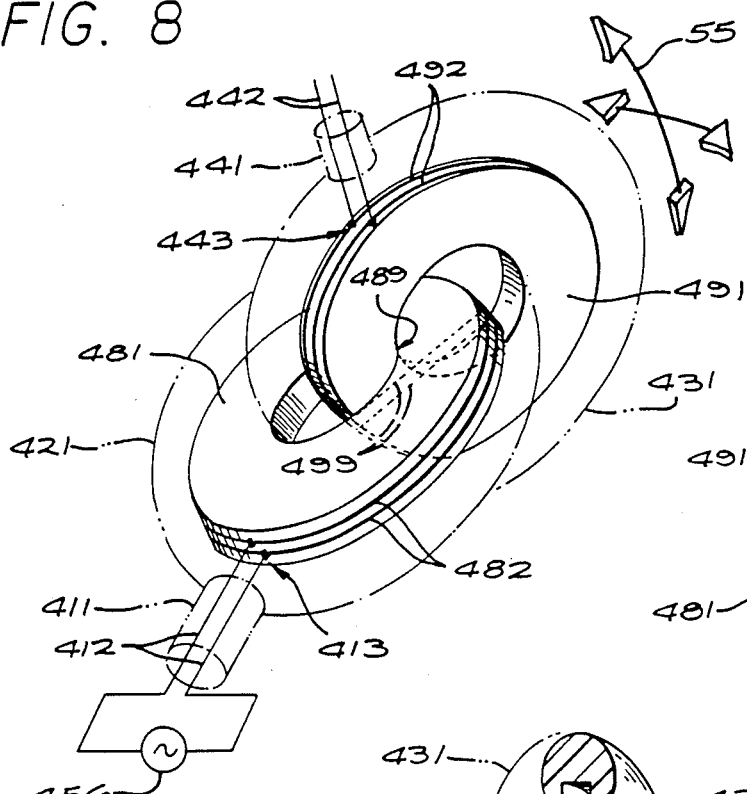
FIG. 8
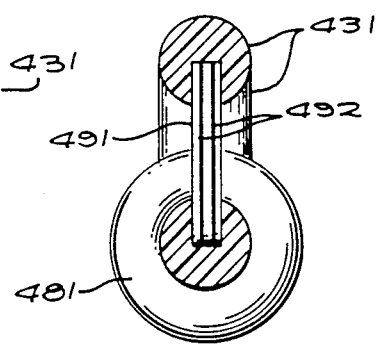
FIG. 9
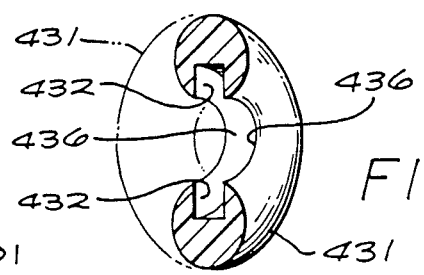
FIG. 10
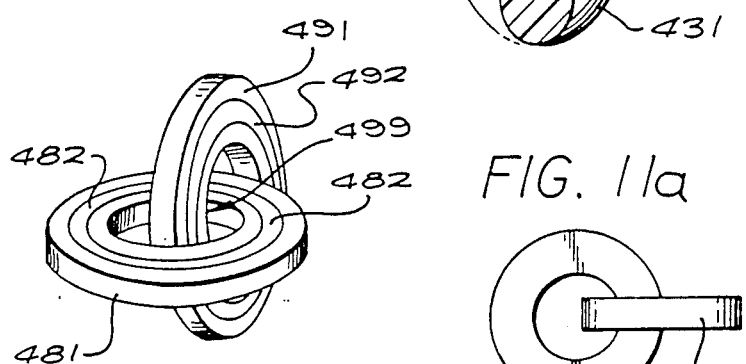
FIG. 11
FIG. 11a
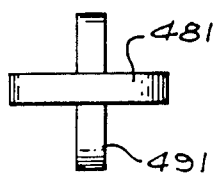
FIG. 11c
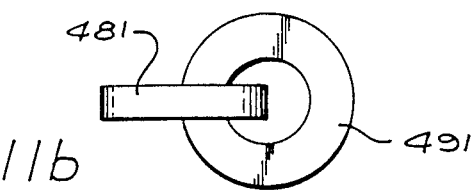
FIG. 11b FIG. 12
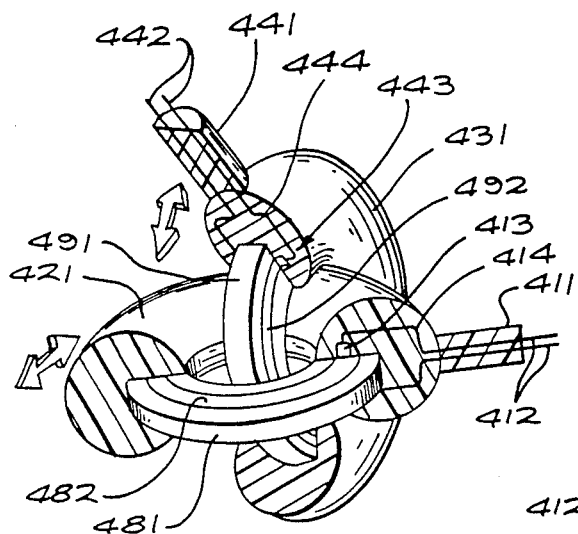
FIG. 13
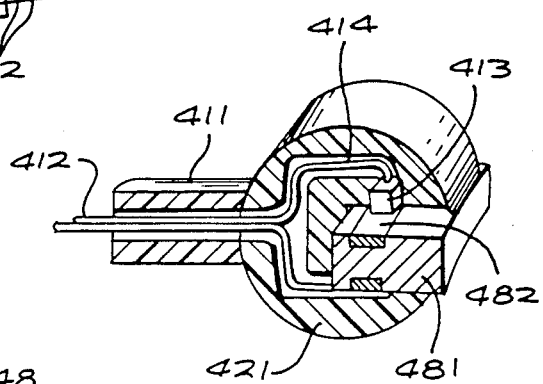
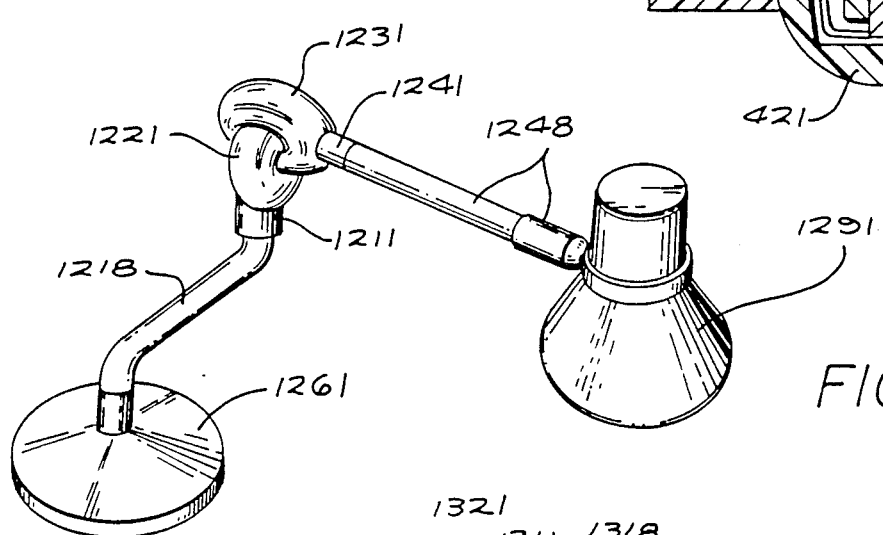
FIG. 14
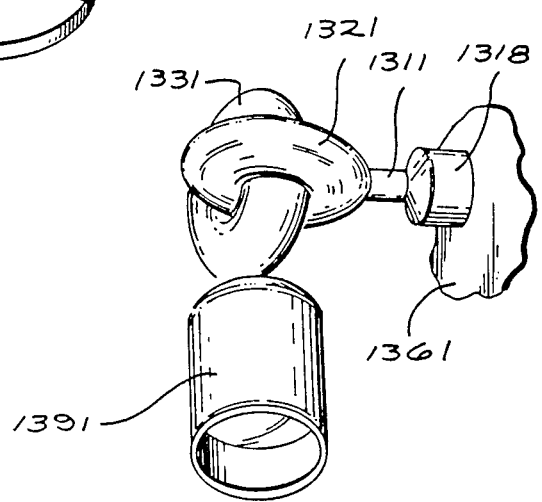
FIG. 15

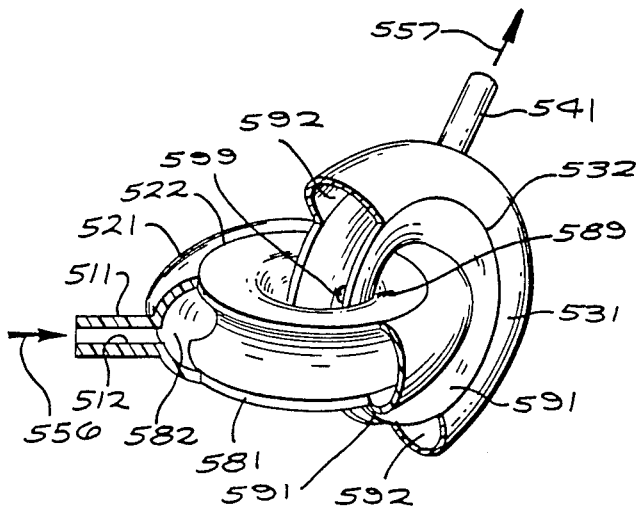
FIG. 16
FIG. 16a
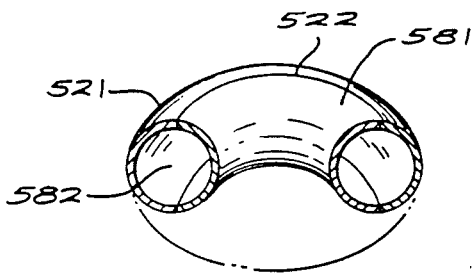
FIG. 16b
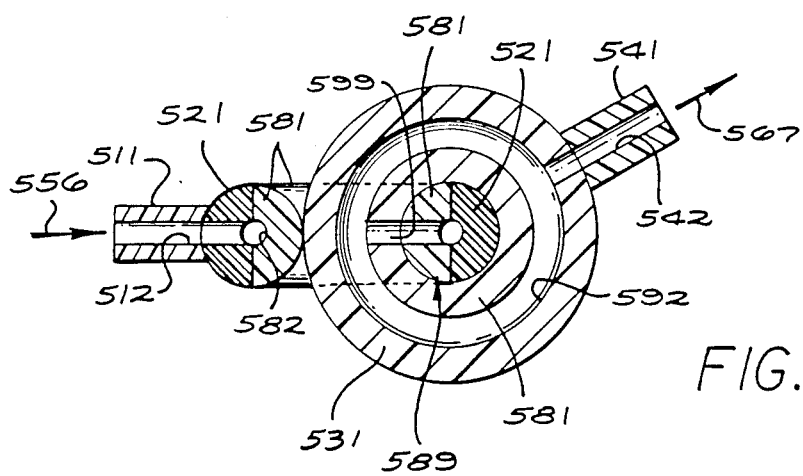
FIG. 17
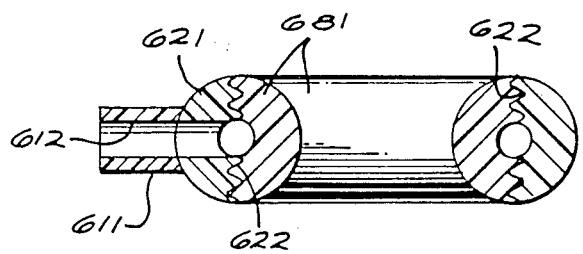
FIG. 18

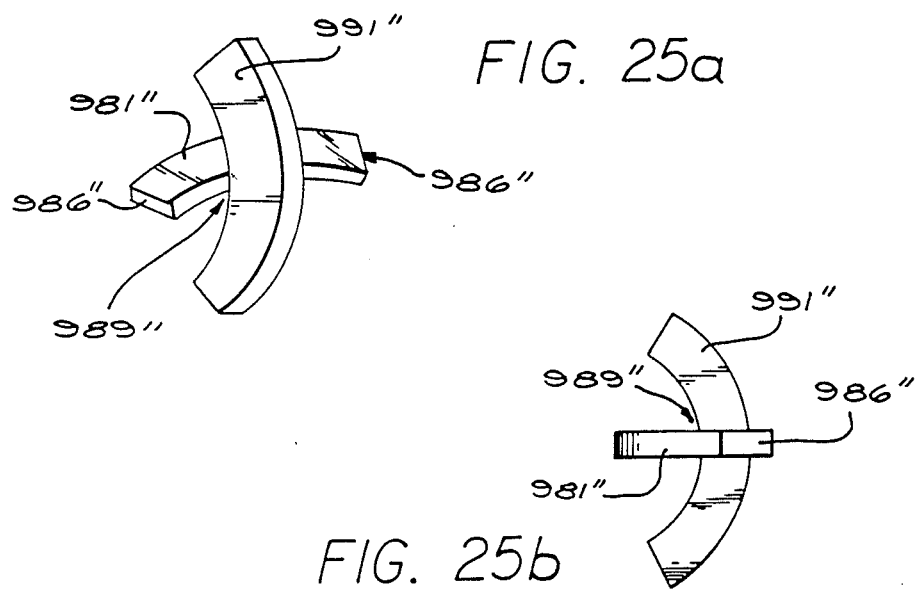
FIG. 25a
FIG. 25b
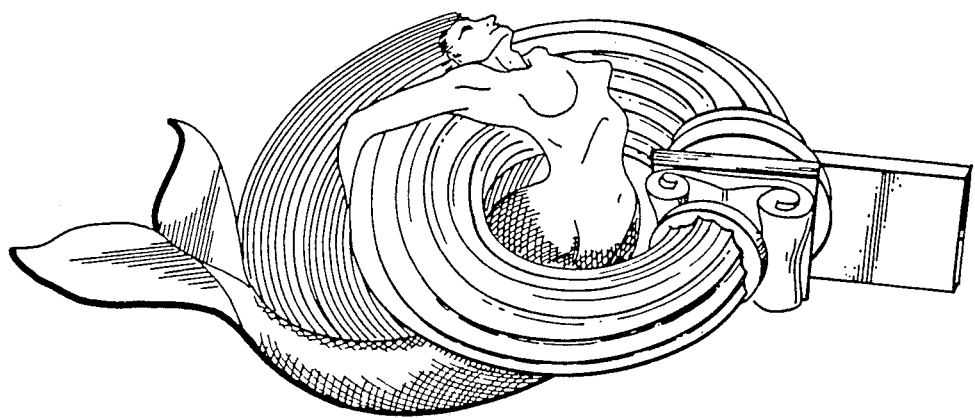
FIG. 26

CONNECTIVE JOINT WITH INTERLOCKING RING STRUCTURES, ADAPTABLE FOR WATER CONDUCTION

This is a divisional of co-pending application Ser. No. 07/059,966 filed on June 9, 1987 now U.S. Pat. No. 4,845,603.

BACKGROUND

1. Field of the Invention

This invention relates generally to connective mechanical joints; and more particularly to a joint that permits relative rotation of the interconnected articles—through large angles, and about an axis having virtually any arbitrarily selectable orientation. The joint can be adapted to transmit a force or a flux between the articles.

2. Prior Art

Known connective joints may be considered in three very broad categories: the hinge, which provides large-amplitude rotation between two hinged elements, but only about a single axis; the ball-and-socket joint, which provides rotation about arbitrarily selectable axes, but usually with limited range of rotation; and the universal joint, which is in effect a two-stage hinge.

Both large-amplitude rotation and a wide range of rotational axes are achieved with a universal joint by combining two hinges in series, generally at right angles. The selection of rotational axes is essentially arbitrary if rotation is permitted about one or both points of attachment of articles to the universal joint—for rotatable shafts.

With a ball joint, rotational range is particularly limited when a fluid flux is to be transmitted across the joint—as, for example, in a liquid-transmitting joint such as a shower head.

In two different senses, torque can be transmitted through a hinge or universal joint. First, an article attached to one side of the joint can be rotated by rotating an article attached to the other side of the joint —provided that the rotation is about an axis on which the hinge or universal joint is not free.

(The availability of such an axis for useful purposes depends upon the relative orientation of the two sides of the joint. For example, suppose that the two articles are drive shafts, but the joint is initially operated so that these shafts are mutually at right angles. Now rotation of either shaft about its own axis can be transmitted through the joint to the other, but of course the resulting rotation of the receiving shaft is not about its own axis.)

Force or torque can also be transmitted through a hinge or universal joint in a second sense. For such transmission, a gear or a traction surface is provided on an article at one side of the joint, and a suitably mating drive gear or traction wheel is provided on an article at the other side of the joint. With this arrangement, forcible rotation of the gear or wheel results in operation of the joint itself—i. e., change of the relative angle (or angles) at which the two articles are joined.

In the prior art, it has not been readily feasible to interconnect articles for rotation through large angles about a virtually arbitrary axis, using a single-stage joint. Such connection has been particularly awkward with transmission of force or a flux across the joint.

SUMMARY OF THE DISCLOSURE

By way of introduction, the present invention in its simplest forms may be very roughly conceptualized as a particularly efficient single-stage hinge, in which there is no separate hinge pin as such. Instead, each side or element of the hinge can itself serve as the hinge pin, entering or leaving this role at the pleasure of the user.

Even though this "hinge" has only one stage, its two sides or elements pivot about different axes, thereby permitting operation of the hinge about virtually any axis the user selects. Consequently this single-stage hinge is free to rotate in as many different directions, roughly speaking, as a universal joint. Furthermore, being a hinge rather than a ball joint, it operates through a very wide angular range.

Alternatively, and curiously, the invention can be very roughly conceptualized as a hinge in which everything except the hinge pin has been eliminated—but there are two hinge pins, each rolled or wrapped around the other in an endless ring, to permit operation of the hinge in virtually any direction.

These informal conceptualizations of my invention may seem contradictory and slightly baffling, but as will shortly be clear both of them are reasonably accurate. I shall now present some more-rigorous definitions of the invention.

In one basic form, my invention is a connective joint providing a rotational component of relative motion of two articles, about an axis having any arbitrarily selectable orientation. This form of the invention includes two interlocking toroids.

In this form of my invention, each of the toroids has a substantially circular minor cross-section and a substantially circular central aperture. The minor cross-section of each toroid is sized to substantially just fit through the central aperture of the other toroid.

This first basic form of my invention also has, on each toroid, some means for securing that toroid to a respective one of the two articles. For purposes of generality of description, I shall call these means the "connection means."

The preceding three paragraphs may constitute a description of my invention in its broadest or most general form. There are, however, certain additional features or characteristics which I prefer to incorporate in articles made according to my invention, for most complete development and enjoyment of its inherent advantages.

For example, I consider it preferable to make the sizing tight enough to provide significant frictional resistance to relative motion of the two articles. I also prefer to locate the connection means on each toroid at a point substantially along the outer major periphery of that toroid.

As a matter of personal preference I consider the appearance of the joint particularly pleasing if the minor cross-sections of the two toroids are made substantially equal to one another in diameter. For some applications, as will be appreciated by those skilled in the art, this condition will also be preferable for mechanical strength or other practical properties.

On the other hand, for the sake of variety in some applications the joint may be made with the minor cross-sections of the two toroids different. For some may also be preferable in applications such a construction may also be preferable in practical terms.

It will be understood that either of such articles may be a substantially stationary fixture—such as a wall, an article of furniture, or an appliance pedestal (such as, for example, a lamp base). In that event, the connection means on one of the toroids are secured to the stationary article On the other hand, one or both of the articles may be embedded within or fixed as a thin sheathing or jacketing upon one or both of the toroids respectively. In such cases the connection means are of course adapted for connection of such articles; they may not necessarily appear as discrete features in or on the toroids.

I shall now describe another basic form of my invention. It is a connective joint providing a rotational component of relative motion of two articles, about an axis having an arbitrarily selectable orientation.

This form of my invention includes two interlocking toroids, each having a substantially circular minor cross-section and a substantially circular central aperture. The minor cross-section of each toroid is small enough to fit through the central aperture of the other toroid—but in this form of my invention it is not required that they fit closely.

Instead this form of my invention includes some means for securing the two toroids together, for mutual arcuate motion Finally this form of the invention includes, on each toroid, connection means for securing that toroid to one of the two articles respectively.

This second basic form of my invention may be described in its most general terms by the foregoing paragraphs. Once more, however, I prefer to incorporate various features or characteristics to optimize effectiveness and enjoyment of the invention.

In particular, I prefer to provide the mutual-securing means in the form of an annular track or groove defined along the inner periphery of the central aperture in a particular one of the two toroids, and an inner ring movably disposed within this groove.

These preferred elements of the securing means may be described in a more general way as: an arcuate guide member, and a corresponding follower member, adapted and disposed to ride along the corresponding guide to define an arcuate motion of the follower relative to the guide. Various forms of guide and follower member may be provided other than an annular track or groove and an inner ring.

In particular, it is not necessary to use a complete ring or complete track. A partial ring or partial track, or both a partial ring and a partial track, may be provided within the scope of this form of my invention.

Only enough mutually constraining structure is required to provide the desired mutually arcuate motion. For example, it will be clear to skilled mechanical artisans that a great variety of three-point-contact guide-and-follower sets—merely to state one of myriad possible examples—may be substituted beneficially for a complete ring and track.

Furthermore, it is not necessary that the toroid actually ride on the inner guide structure, in the sense suggested by the simplified track (or groove) and ring conceptualization. That is, it is not necessary that the outer structure have an inner track (such as a groove) that rides on an inner ring. Rather, the track (or groove) may be associated with the inner structure, while the ring equivalent may be associated with the toroid.

This second form of my invention can further be used in transmitting a force or flux between the two toroids.

As will be seen, forces or fluid or electrical fluxes, or combinations of two or more such fluxes or forces, can be transmitted between the two toroids while preserving the relative mobility and—if desired—the independent appearance of the toroids.

To realize this potentiality, I also prefer to include some means for transmitting a force or a flux along a generally circular path within the particular toroid having the inner elements just discussed. I shall call these means the "intratoroid transmitting means", since they transmit force or flux within the particular one toroid.

These means preferably make use of the inner-peripheral track-and-groove—or, more generally, the guide-and-follower set, just discussed. The generally circular path is associated with these inner elements. In other words, the same inner elements are advantageously used both to provide relative mechanical suspension of the two toroids, and to transmit force or flux along a path within at least one of the toroids.

As will become clear, two separate sets of inner elements within the toroid can be provided for these two functions respectively. I prefer to use one set within the toroid for both functions.

This form of my invention also includes some means for transmitting the force or flux from the above-described path to the other toroid. Again for generality I shall call these the intertoroid transmission means, as they transmit force or flux between two toroids.

I show and describe several such preferred features, as well as certain variants or versions of this second basic form of my invention, in the detailed-description section of this document. First, however, I wish to introduce yet another basic form of my invention.

This third form of the invention is a connective joint providing a rotational component of relative motion of two articles.

It includes a pair of interlocked inner rings. The two rings are fixed together at a common area along the inner peripheries of both rings.

This form of the invention also includes two interlocked outer structures. Each of these outer structures has a very generally arched body surrounding a very generally central aperture.

Each of the outer structures also has a peripheral track about its central aperture. Each outer structure is movably mounted by this track to ride on a respective one of the rings. In other words, the rings and tracks are mutually engaged, so that each outer structure is movably mounted to the corresponding ring.

This configuration constrains the interlocked outer structures to mutually arcuate compound trajectories. That is, the inner rings constrain the two outer structures to move along arc-shaped paths relative to one another.

If desired, one or each of the tracks may take the form of a groove around the periphery of the central aperture of the corresponding outer structure. In this version of this form of the invention, the ring simply fits in the groove, so that the outer structure rides on the ring.

More elaborately formed or engaged tracks and rings may be provided, as will be further detailed shortly. Bearings may be interposed if desired for smoother operation.

In describing the mutually arcuate trajectories of the outer structures, I have included the term "compound" for a very important reason. The possible trajectory or path for each of the outer structures is not limited to only one arcuate motion such as a simple rotation or revolution about the other outer structure.

Rather the motion of each outer structure may include, in effect, travel or displacement along the contour of the other outer structure. Rotation or revolution may be alternated, or may even be concurrent, with such travel or displacement.

Therefore very elaborate mutually arcuate compound trajectories are possible. This is so even though, as already mentioned, the inner rings are solidly joined.

The body of each outer structure is small enough to fit through the central aperture of the other outer structure—in at least part of their trajectories. It need not fit through the central aperture of the other outer structure in all of their trajectories.

Details of the outer structures may be selected essentially arbitrarily, either for practical reasons or for esthetic reasons such as implementing a particular theme. Accordingly it may be very desirable to make some parts of one or each outer structure too large to fit through the central aperture of the other structure.

For example, one of the outer structures might be configured to represent the body of an animal, passing through the central aperture of the other structure. The head or perhaps certain limbs of the animal figure might extend laterally too far to pass through that aperture.

This third form of my invention also includes connection means on each outer structure. The connection means on each outer structure are provided for securing that particular structure to one of the two articles respectively.

Like the previously discussed second form of my invention, the third form is also capable of use for transmitting a force or a flux between the articles. To develop this capability, I prefer to include in this third form of my invention some means for transmitting force or flux along paths within the outer structures.

These paths are generally circular, and each is associated with one respective inner ring. For generality as before I call these means "intrastructure transmitting means."

In addition this form of my invention includes some means for transmitting the force or flux from the path associated with one ring to the path associated with the other ring. I call these means "interstructure transmitting means"; they are defined adjacent to or through the common area at which the rings are joined.

To aid in comprehension initially, the foregoing description of the third form of my invention has been stated with somewhat specific reference to inner "rings" that are fixed to one another, and "tracks" that ride on the rings. Like the second form of my invention, however, this third form is actually much broader than might be supposed from this description.

In particular, partial rings or partial tracks, or both, may be provided. Only enough mutually constraining structure is required to provide the desired mutually arcuate compound trajectories, various types of guide-and-follower sets being substitutable for complete rings and tracks. Furthermore, as with the second form of my invention, it is not necessary that the outer structures actually ride on the inner guide structures.

For these reasons a more general description of the third form of my invention will now be presented. This form of the invention is a connective joint that provides a rotational component of relative motion of two articles.

It includes a pair of guide-and-follower sets. Each set includes an arcuate guide member and a corresponding follower member. The follower member is adapted and disposed to ride along the corresponding guide to define an arcuate motion of the follower relative to the guide.

One particular member of each set has an inner periphery. The two particular members of each set are fixed together at a common area along the inner peripheries of both particular members. By virtue of this configuration the remaining two members are constrained to mutually arcuate compound trajectories.

This form of the invention also includes two interlocked outer structures, each having a very generally arched body surrounding a very generally central aperture. Each of the two outer structures is fixed to one of the "remaining two members" just mentioned. Due to this configuration, the interlocked outer structures are likewise constrained to mutually arcuate compound trajectories.

The body of each outer structures is small enough to fit through the central aperture of the other—in at least part of the trajectories of the outer structures.

The invention, in the form now under consideration, also has connection means on each outer structure for securing that structure to one of the two articles respectively.

The foregoing description of the third form of my invention, presented now more generally, is able to function as a connective joint. Its mechanical function as a joint is in effect essentially the same as that of the first-mentioned form of my invention, consisting of closely interlocked toroids.

This form of the invention is also useful for transmitting a force or a flux between the outer structures, and even between the respectively attached articles. When so used, this form of the invention includes some means for transmitting force or flux along two generally circular paths within the outer structures respectively.

I shall call these means the "intrastructure transmitting means". Each of the two paths is associated with one respective guide-and-follower set.

This form of my invention further includes some means for transmitting force or flux from the path associated with one guide-and-follower set to the path associated with the other set. These means, which will be called "interstructure transmitting means", are defined adjacent to or through the common area at which the previously mentioned "two particular members" are joined together.

This third form thus has the added capability of force or flux transmission between the outer structures. In some cases such transmission can be provided between the two attached articles secured at the respective connection means.

If desired, the parts of the invention can be formed to nearly conceal the existence of the inner guide-and-follower sets, so that the transmission capability of the assembled invention appears very extraordinary. A casual observer will not perceive how a device having so many degrees of freedom could, for example, conduct fluids or electricity in a circuit.

All of the foregoing operational principles and advantages of the present invention will be more fully appreciated upon consideration of the following detailed description, with reference to the appended drawings, of which:

BRIEF DESCRIPTION OF THE DRAWINGS

FIG. 1 is a perspective view of a preferred embodiment of my invention. It represents in particular the previously mentioned first basic form of my invention. The other basic forms may also have exactly this same external appearance, though it is also possible for them to vary extremely from this configuration.

FIGS. 1a, 1b and 1c are front, rear and side elevations or orthographic projections of the FIG. 1 embodiment, on a reduced scale.

FIG. 2 is a front elevation, partly in section, of the same preferred embodiment, particularly showing the relationship between dimensions.

FIG. 3 is a front elevation, on a reduced scale, of a related embodiment having a different relationship between dimensions.

FIG. 4 is a front elevation of the embodiment of FIGS. 1 through 2, illustrating the range of possible angular positions of one toroid about the other, while the location of that one toroid along the other is held fixed.

FIGS. 8 through 26 represent preferred embodiments of the previously mentioned second and third basic forms of my invention.

FIG. 8 is a perspective view, very generally similar to FIG. 1, of a preferred embodiment of these forms of my invention as adapted for bidirectional conduction of electricity completely across the joint—that is, between articles secured to the connection means of the two outer structures respectively.

In FIG. 8 the outer structures (here, for the sake of simplicity, also toroids) are drawn as if transparent. FIG. 8 thus clearly shows both the inner and outer structures in their interrelationship, and indicates in a somewhat schematic way the function of the inner structures (here complete rings) for electrical conduction.

FIG. 9 is an elevation, partially in section, of the same embodiment—with the inner structures in detail.

FIG. 10 is a perspective view of the same embodiment, particularly showing the track (here a groove) of one of the outer structures.

FIG. 11 is a perspective view of the joined inner rings alone.

FIGS. 11a through 11c are front, rear and side elevations or orthographic projections of the FIG. 11 rings.

FIG. 12 a perspective view, partially cut away, of the embodiment of FIGS. 8 through 11c, particularly showing the arrangement for conduction of electricity to and from the joint.

FIG. 13 is a perspective view, on an enlarged scale, of the same embodiment—also particularly showing how electricity may be conducted to and from one side of the joint.

FIG. 14 is a perspective view of a table lamp, incorporating the joint of FIGS. 8 through 13.

FIG. 15 is a like view of a track-lighting fixture incorporating the same embodiment.

FIG. 16 is a perspective view, partially cut away, of a preferred embodiment of the second and third forms of my invention as particularly adapted for conduction of fluid completely across the joint—that is, between articles secured to the connection means of the two outer structures respectively.

FIG. 16a is a cross-sectional view of one of the toroids of the FIG. 16 embodiment, FIG. 16b is a view showing its division into the inner and outer structures.

FIG. 17 is a somewhat schematic elevation of the same embodiment with somewhat thicker walls, and particularly delineating the conduction of fluid entirely across the joint.

FIG. 18 is an elevation, partly in section, of the same embodiment with a wall configuration particularly suited to minimize leakage from the joint.

FIG. 19 is a perspective view of a shower head incorporating the embodiment of FIGS. 16 through 17 or 18.

FIG. 20 is a perspective view, partially cut away, of a preferred embodiment of the second and third basic forms of my invention as adapted for transmission of force to the joint at both sides—that is, between an article secured to the connection means of each outer structure and the corresponding inner structure.

FIG. 21 is a similar view of a preferred embodiment of any of the three forms of my invention as adapted for minimization of friction in the joint.

FIG. 22 is a somewhat schematic or conceptual diagram of a different guide-and-follower set for use in some embodiments of the second or third basic form of my invention.

FIG. 23 is a like diagrammatic view of another such guide-and-follower set.

FIG. 24 is a like diagram of still another such guide-and-follower set.

FIGS. 25a and 25b are perspective and elevational views, respectively of a partial internal ring structure also usable as a guide-and-follower set in some embodiments of the second or third basic form of my invention.

FIG. 26 is a perspective view of an embodiment of my invention such as might be used in, for example, either a functional objet d'art or an inexpensive novelty item. Here the outer structures are not toroids or any other kind of regular geometric form, but rather are highly irregular and fanciful figures.

DETAILED DESCRIPTION OF THE PREFERRED EMBODIMENTS

Figure 5:
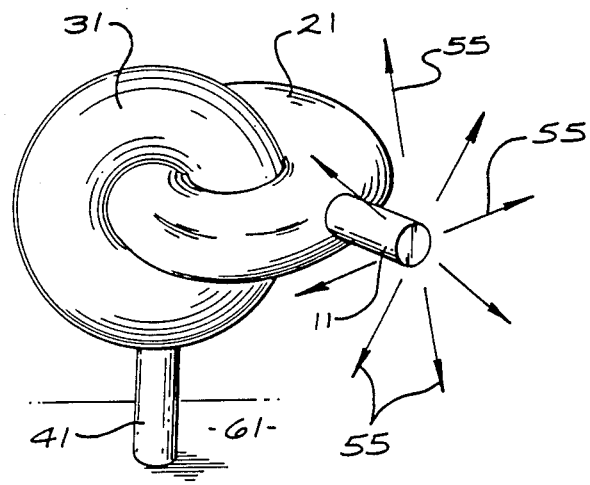
FIG. 5 is a perspective view of the same embodiment—but particularly showing the connection means of one toroid secured to a fixture such as a wall or pedestal, so that any article secured to the other connection means is movably secured with respect to the environment.

The basic appearance of certain preferred embodiments of my invention is illustrated in FIGS. 1 through 1c. This embodiment may be simply a mechanical joint used for purposes of adjustable positioning, or as explained below it may be provided with internal elements for flux or force transmission.

The joint includes two toroids or "doughnut"-shaped parts 21 and 31 which interlock. In the illustrations, one toroid 21 is drawn to appear horizontal, and for definiteness of the following discussions will be called the "horizontal toroid"; the other toroid 31 will be called the "vertical toroid".

On each toroid is a connection part, 11 and 41 respectively, for attachment of articles to the joint. For clarity in illustrating the relative orientation of the two toroids, the connection parts 11 and 41 have been shown as projecting small cylinders. The illustrated connection elements 11 and 41 are fixed along the outer peripheries of the respective toroids 21 and 31, and project radially outward.

As mentioned earlier, however, even the attached articles themselves may be embedded or surface elements. Hence the connection parts can take a great variety of different forms, including recesses, tapped or detented holes, or surface-attachment areas.

As shown in FIG. 2, each toroid 21 or 31 has a respective circular central aperture 26 or 36. The body of each toroid is circular in cross-section, and preferably for most purposes the figures are substantially geometrically regular.

In particular, each toroid body is substantially uniform in size all the way around. Thus in FIG. 2 the diameter D of the body of the horizontal toroid 21 as seen (in cross-section) at the far right side of the drawing is equal to the diameter B of the body of the same toroid 21 as seen (likewise in cross-section) nearer to the left side of the drawing.

Similarly the diameter A of the body of the vertical toroid 31 as seen (in elevation) at the far left side of FIG. 2 is equal to the diameter C of the body of the same toroid 31 (likewise in elevation) nearer to the right side of the drawing.

For most purposes the body of each toroid is preferably sized to just fit through the central aperture of the other—and allow relative motion with some desired amount of freedom. As a practical matter the relative sizes may vary from a press fit to a substantial clearance.

The precise size relationships chosen will vary with the frictional characteristics of the two surfaces involved (which may vary from Teflon" through Velcro"), the resiliencies of the two toroidal bodies, the weights and orientations of article(s) to be suspended, whether stabilization is otherwise provided, and generally the purpose or application of the joint.

In other words, the minor diameter of each toroid is very nearly the same size as the diameter of the central aperture of the other toroid. By "minor diameter" I mean the diameter as measured across the small dimension of the body.

The toroids 21 and 31 shown in FIGS. 1 through 2 are substantially the same size—both in major and minor dimensions. Thus in FIG. 2 the minor diameter A or C or the vertical toroid 31 is equal to the minor diameter B or D of the horizontal toroid 21.

Accordingly, for the toroids in FIGS. 1 through 2, the major diameters are also equal. That is, the major diameter A+B+C of the vertical toroid 31 is equal to the major diameter B+C+D of the horizontal toroid 21.

As demonstrated in FIG. 3, however, my invention can be made and used without observing these equalities. The horizontal toroid 121 of FIG. 3 has a much smaller minor diameter than the vertical toroid 131.

Nevertheless, as in the equal-toroid case for the first form of my invention, the central aperture of each toroid must approximately match the minor diameter of the other. Consequently, for the vertical toroid 131, the central-aperture diameter is much smaller than the minor diameter; but the opposite is true of the horizontal toroid 121.

In any of these constructions, each toroid can shift relative to the other, in two different kinds of motion. First, as suggested by the double-headed vertical arrow 51 (FIG. 1), the horizontal toroid 21 can rotate vertically about the major axis of the other toroid—the vertical toroid 31.

(By the major axis I mean the straight line 38 that passes through the center of the aperture—the "doughnut hole"—in the vertical toroid 31, at right angles to the central plane of that toroid. Tangent to this major axis of the vertical toroid 31 is the minor axis of the horizontal toroid 21, which is the circular centerline of the endless body that constitutes the toroid 21. Regardless of orientation of the two toroids, the major axis of each is always tangent to the minor axis of the other, at some point along that minor axis.)

When so rotated about the major axis of the vertical toroid 31, the horizontal toroid 21 is also rotating about its own minor axis, at the point of tangency between those two axes. It seems natural to think of the horizontal toroid 21 in this mode of rotation as traveling along the body or the arch of the vertical toroid 31.

As stated above, however, a second kind of motion is also available. As suggested by the rotation of the double-headed horizontal arrow 52, the horizontal toroid 21 can rotate about its own major axis 28 (FIG. 1a). That axis is tangent to the minor axis 37 of the vertical toroid 31, also at the point of rotation. It seems natural to think of the horizontal toroid 21 in this mode of rotation as circling around the body of the vertical toroid 31.

The reason for describing these geometrical relationships in such detail is to show that the two axes of rotation available for the horizontal toroid 21 are mutually offset. The distance between them is equal to the radius of the circular minor axis of the toroid that is being considered stationary for purposes of this discussion —that is, the vertical toroid 31.

From these observations it will be understood that this joint provides as many degrees of freedom as a ball joint or a universal joint. The kind of motion provided, however, is unlike the relative motions available with prior joints.

More specifically, a ball joint generally speaking provides rotation about the center of the entire joint system. A universal joint may be designed to provide rotations in orthogonal directions about mutually offset axes, but the usual design effort is to avoid such an offset so that the U-joint behaves as much as possible like a ball joint.

My interlocked-toroid joint intrinsically provides rotation about offset orthogonal axes. Neither axis is at the center of the joint system—which will be found at a common surface point along the inner peripheries of the central apertures of the two toroids.

It will be understood that if the horizontal toroid 21 is rotated about its own minor axis, in either direction indicated by the vertical arrow 51, this toroid 21 will no longer be horizontal. It will still, however, be capable of rotation about the minor axis of the other toroid, in either direction indicated by the horizontal arrow 52.

In general, the only limitation on angular range of action for each toroid is imposed by impingement of the connection element of each toroid upon the exterior surface of the other toroid. (This consideration is in fact a limiting one only if the connection elements 11, 41 do in fact project from the toroid surfaces 21, 31. As earlier pointed out, my invention can be effectively constructed and used in other forms.)

For example, as shown in FIG. 4, the connection element 41 of the vertical toroid 31 can be rotated counterclockwise (as drawn) to its indicated position hard against the lower surface of the horizontal toroid 21. This condition represents one end of the range of motion for that toroid 31. The same connection element 41 can also be rotated clockwise against the upper surface of the horizontal toroid 21, to its position indicated at 41', to establish the other end of the range of motion.

The range of angular motion for each toroid relative to the other approaches roughly 331° for negligibly slender connection rods 11, 41; or roughly 317° for connection rods about half the minor diameter of the toroids. Those skilled in the art of mechanical devices will appreciate that this is far larger than available with a practical ball joint.

Excepting extreme positions such as shown in FIG. 4, when either toroid is held fixed the other can be moved to nearly any orientation. For example, if as shown in FIG. 5 the connection element 41 of the vertical toroid 31 is fixed—as to a wall or floor 61—the connection element 11 of the horizontal toroid 21 can be moved through compound arcuate trajectories to point in almost any direction. The relative orientation of the two toroids in FIG. 5 is intended to represent such substantially arbitrary positioning.

With the toroids so oriented, the connection element 11 can in general then be repositioned in virtually any direction, as suggested by the arrows 55 of FIG. 5. The joint thus provides great freedom of angular orientation.

If the connection element 11 of the horizontal toroid 21 is held fixed, conversely, the connection element of the vertical toroid 31 can be pointed in nearly any direction. Such reorientation is possible using the same two kinds of rotation as already described for the horizontal toroid 21.

That is, the vertical toroid 31 is free to rotate vertically or horizontally, or both. Vertical rotation about its own horizontal major axis 38 (FIG. 1c), as shown by the two-headed arrow 54 (FIG. 1), carries the connection element 41 to other vertical positions 41'. Horizontal rotation about its own circular minor axis 37 is shown by the two-headed arrow 53.

As a matter of abstract geometry, rotating either toroid about its own major axis is equivalent to rotating the other toroid about its own minor axis. Hence in pure principle there are not four but only two kinds of motion. In practice, however, the implications of these two motions may be vary greatly, depending on which (if either) side of the joint is held fixed and which is movable on the other.

In addition it is possible to leave one or both of the connection elements 11 and 41 free to rotate about their own axes, at their points of attachment with the respective toroids 21 and 31—or at their points of attachment with articles which they secure to the toroids. Additional degrees of freedom of the joint can thereby be provided, in applications for which such additional mobility is appropriate.

Figure 6:
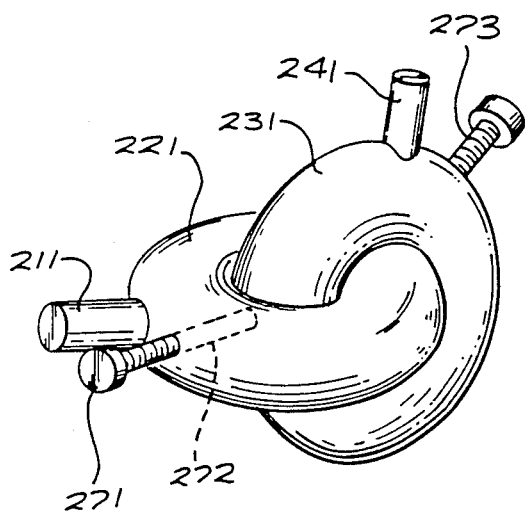
FIG. 6 is a similar perspective view particularly showing lock screws for fixing the joint in a particular orientation.

If desired the joint may be provided with stabilization devices such a set-screw 271 (FIG. 6) that passes through a threaded hole 272 in one toroid 221 and into or against the other toroid 231. If preferred for greater force and reliability in stabilization, a second set-screw 273 can be similarly mounted in the other toroid 231 for action against the first toroid 221.

Other types of stabilization devices may be used instead. Alternatively, the sizes and surface properties of the toroids can be designed to provide adequate stabilization for many intended uses without set-screws or other accessory stabilizers.

Figure 7:
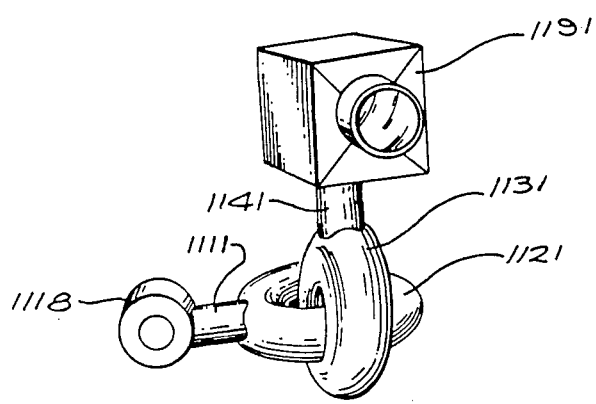
FIG. 7 is a similar view, on a reduced scale, particularly showing the invention in use for adjustable mechanical support of equipment such as a camera.

The mechanical joint thus provided is useful in a great many practical applications. FIG. 7 shows two interlocked toroids 1121 and 1131 used to support a camera 1191 or the like. A connection element 1111 links one toroid 1121 to a tripod head 1118 or the like, and another connection element 1141 links the other toroid 1131 to the camera 1191.

Additional capabilities can be provided the interlocked-toroid system by inner rings or other inner guide-and-follower structures as shown in FIGS. 8 through 25b. If desired, such inner structures may also, or instead, be used to remove some of the mechanical limitations on the relatively simple system described so far.

For example, with inner structures it becomes possible to eliminate the requirement that the minor cross-section of each toroid make a fairly close fit through the central aperture of the other toroid. Very large clearances may be employed, so that one toroid appears suspended within the other.

It is also possible to depart from uniformity of dimensions of the outer structures, and even from the condition that they be toroids generally. Virtually arbitrary outer shapes may be employed, within the scope of certain of my appended claims.

Probably the most interesting change introduced by such inner structures, however, is the addition of ability to transmit forces or fluxes. Such transmission can be from an article connected to one toroid to an article connected to the other, through both toroids—or if desired for particular applications can be only through part of this series of objects.

If desired, such transmission can be provided in addition to the use of very large clearances between the toroids, and in addition to the use of arbitrary shapes. If preferred, however, force or flux transmission can be provided using the geometry already introduced in connection with FIGS. 1 through 7.

FIGS. 8 through 13 illustrate toroidal outer structures 421 and 431 fitted with respective joined-ring inner structures 481 and 491. These particular inner rings 481, 491 are adapted to conduct electrical fluxes or currents on two generally parallel conductors, to provide a complete "round trip" electrical circuit.

The rings 481 and 482, like the toroids 421 and 431, are interlocked. Unlike the toroids, however, the rings 481 and 491 are also firmly fixed to one another, forming a permanent one-piece, solid inner structure.

The rings are joined at a common area 489 along the inner peripheries of both rings. As shown, they are at right angles: this condition is necessary if the toroids 421, 431 fit closely together, but is optional if there is to be considerable clearance between the toroids.

A groove 432 (FIG. 10) is formed along the inner periphery 436 of one toroid 431; and preferably a like groove (not illustrated) is provided in the other toroid 441. The rings 481, 491 fit within these grooves, so that the inside surfaces of the grooves ride on the internal rings.

For closely fitted toroids, when all the pieces are assembled in this way the rings are substantially concealed deep within the central apertures of the toroids, so that a casual observer will be unaware that there is any inner structure. Even for toroids that have considerable clearance, the rings and grooves can be made very inconspicuous.

The inner rings 481, 491 here shown are of plastic, ceramic or other insulating material. They are provided, however, with respective annular metal or other conductive surfaces 482, 492. These annular conductors are disposed along pathways defined along or near the peripheries of the rings 481, 491.

The conductors 482 on one ring 481 are interconnected with the conductors 492 on the other ring 491, by bridging conductors 499. The bridging conductors pass through or immediately adjacent to the common joinder area 489.

The previously mentioned groove 432 in one toroid 431 is also fitted internally with electrical brushes 443 (FIG. 12), disposed to engage and make electrical contact with the conductive surfaces 492 on the ring 491. These brushes 443 are connected by wires or other suitable electrical conductors 444 that pass through the body of the toroid 431.

The latter conductors 444 are continuous with like conductors 442 that pass through the connecting element 441 and to an article that is attached to that connecting element. That article typically will provide either a source of electrical power or signals, or a device that uses such power or signals, or both.

Similarly the unillustrated inner groove in the other toroid 421 also has electrical brushes 413 (FIGS. 12 and, showing greater detail, FIG. 13) to engage and make contact with the conductors 482 on the corresponding ring 481. These latter brushes 413 are connected by wires 414 or the like through the body of the toroid 421, to wiring 412 in the corresponding connecting means 411—and thence to an article attached to that connector.

The article just mentioned will typically provide a usage or source of electricity that complements the source or usage provided by the first-mentioned article on the other side of the joint. For instance, if the joint is used in a table lamp as in FIG. 14, the connecting element 1211 of one toroid 1221 receives electrical power from the lamp base 1261 and arm 1218.

The connecting element 1241 of the other toroid 1231 passes the power on to the socket and bulb in the lamp head 1291, through an extension arm 1248. The base 1261, of course, must be suitably wired to an electrical source.

Another type of lamp is shown in FIG. 15. In this example one toroid 1321 draws power through its connection means 1311 from a wall bracket 1318, which is fixed to a wall 1361. The lamp head 1391 receives this power from the first toroid 1321 through the second toroid 1331, and the connection means (not shown) on that second toroid.

Again, the bracket 1318 is wired to a power source (not shown) within the wall 1361. This view may also be taken as an illustration of track lighting, with substitution of a sliding bracket at 1318 and mating track at 1361.

As can be seen in FIGS. 8 through 10, and FIGS. 12 and 13, the rings 481, 491 in effect complete the inner peripheral shapes of the toroids 421, 431 respectively. The rings might be regarded as sealing the internal cavities formed by the grooves. In fact it is not necessary to provide actual fluid-tight seals, since in the applications illustrated in these figures there is normally nothing to escape from or into the interior cavities.

Nevertheless these interior tunnels do suggest a potential for conveying other kinds of flux—in particular, fluxes of liquid or gas—along the circumferential paths formed within the toroids.

In fact fluid fluxes can be transmitted along such paths, and in and out of the toroids through the external connectors and the bridging points where the toroids are joined. A geometry particularly adapted for such applications appears in FIGS. 16 through 18.

Here each inner ring is made in the form of a half-tube 581 or 591. Each inner ring defines the inner half of a hollow toroidal tube, sealed to a respective outer half-tube 521 or 531.

The seals are made so that each outer half-tube can slide along the outward-facing rims or edges of the mating inner half-tube. They do so while maintaining the fluid-tight integrity of the inner cavities 582 and 592 formed between the respective pairs of half-tubes.

As in the versions of my invention illustrated earlier, the two inner half-tubes are joined at their common area 589—along the inner peripheries of both central apertures. A fluid-conveying hole 599 is defined at this junction area 589, providing fluid communication between the interior cavities of the two toroids.

The connection elements 511 and 541 are also made hollow, and in communication with the respective toroidal cavities 582 and 592. Hence fluid communication is established from one connection element 511, through the two toroidal cavities 582 and 592 and the interconnecting hole 599, to the other connection element 541—all as diagrammed in FIG. 17.

If necessary or desired to minimize leakage, the walls of the half-tubes can be made thicker as suggested in FIG. 18, and can be configured—as there illustrated at 622—to provide a longer pathlength for leakage. Alternatively, or in addition, the joint may be provided with separate elastomeric seals (not shown) or the like.

Figure 19:
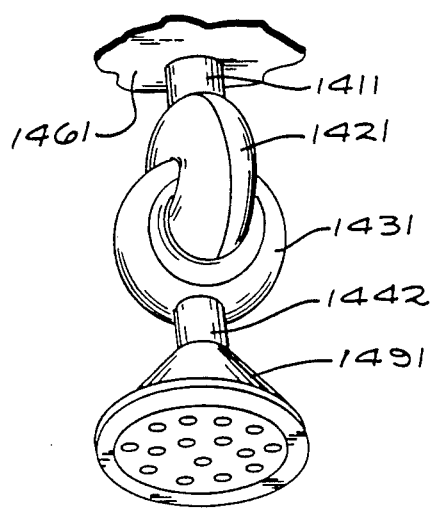

One simple application of these fluid-transmitting joints appears in FIG. 19. One toroid 1421 receives water through an input connection element 1411, from suitable piping within a wall 1461. Another toroid 1431 receives the same water from the first toroid 1421, in the manner illustrated in FIGS. 16 through 18, and passes the water on through an outlet connection element 1442 to a dispensing element such as a shower head 1491.

Through study of the drawings discussed so far it can be verified that nothing prevents superimposing the electrically conductive features of FIGS. 8 through 13 upon the fluid-conducting structures of FIGS. 16 through 18. Similarly it is possible to provide dual or even triple discrete fluid conduits within the joint, by segmenting the toroidal cavities longitudinally and providing separate intertoroidal fluid-communicating holes for the discrete dual or triple conduits.

Therefore both plural electrical circuits and plural fluids can be conveyed through a single joint as required for various applications. Again, this can be accomplished while preserving the mechanical mobility of the joint substantially as described above in connection with FIGS. 1 through 7.

Mechanical forces can also be transmitted through the novel joint of my invention. As mentioned earlier, the concept of force transmission through a joint has two senses or meanings.

First, suppose that the connection elements 11 and 41 of FIG. 1 are firmly fixed to their respective toroids 21 and 31. Suppose also that the toroids are oriented so that the connection elements are at least close to mutual alignment—as they are drawn in FIG. 1. Then, as will be clear from that illustration, rotating either connection element 11 or 41 about its own axis will result in similarly rotating the other connection element 11 or 41.

Another kind of mechanical force transmission through the joint, however, is more difficult to accomplish and correspondingly more interesting. In this second type of force transmission, the joint is an active element in reorienting itself.

In all of the uses discussed above, the joint is merely passive. Forces are applied externally—e. g., manually—to reorient articles at the two sides of the joint.

In all those previously discussed applications, the joint itself does no more than (1) permit motion in response to such forces, to place the articles in desired orientations and positions; and (2) frictionally hold the articles in approximately the positions and orientations in which they were placed. Now I wish to show that the joint can be made self-adjusting.

Figure 20:
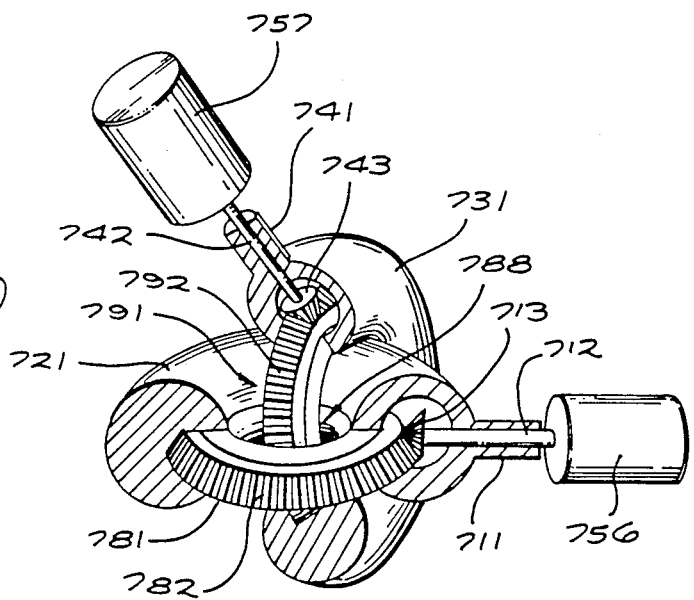

FIG. 20 illustrates a version of my invention that provides that capability. Once again the toroids 721 and 731 are provided, around the peripheries of their central apertures, with internal grooves; and internal rings 781 and 791 respectively are fitted within these grooves.

Once again the internal rings 781 and 791 are mutually interlocked, and are mutually fixed at a common area 788 along the inner peripheries of both rings. Now, however, instead of electricity- or fluid-conducting surfaces the rings 781 and 791 are provided with force-transmitting surfaces 782 and 792 respectively.

The force-transmitting surfaces 782 and 792 are thus defined along very generally circular paths within the respective toroids. Disposed in respective engagement with these surfaces 782 and 792 are mating force-transmitting elements 713 and 743.

These elements 713 and 743 are mounted for rotation in the respective toroidal bodies 721 and 731. Although the force-transmitting elements 713 and 743 are free to rotate about their own axes, those axes are fixed in position along the endless toroidal bodies 721, 731.

The force-transmitting elements 713 and 743 are so shaped, and are engaged with the force-transmitting surfaces 782 and 792 in such a way, that when the elements 713 and 743 rotate they force the force-transmitting surfaces 782 and 792 to move relative to the rotational-axis locations. In other words, the force-transmitting surfaces 782 and 792 are forced to move within the grooves in the toroidal bodies 721 and 731.

Such motion of the surfaces 782 and 792 of course requires motion of the inner rings 781 and 791 along which the force-transmitting surfaces are defined. Consequently the inner rings 781 and 791 rotate relative to the toroids 721, and 731.

Connection elements 711 and 741 are provided on the toroids 721 and 731, at the fixed positions desired for the rotational axes of the force-transmitting elements 713 and 743. Motor casings 756 and 757 are fixed to the connection points 711, 741, and the driveshafts 712 and 742 of the motors are journalled through the bodies of the toroids 721 and 731.

The ends of these driveshafts remote from their motors are fixed to the force-transmitting elements 713 and 743 in such a way that operation of the motors rotates the force-transmitting elements, resulting as previously mentioned in motion of the inner rings 781 and 791 relative to the toroidal bodies 721 and 731 respectively.

For greatest strength and transmission of relatively large forces, the force-transmitting surfaces 782 and 792 may be annular gear teeth defined in the rings 781 and 791. The force-transmitting elements 713 and 743, naturally, are then pinion gears adapted to drive the gear teeth 782 and 792.

Various sorts of gears may be employed, including the bevel ring gears 782, 792 and matching conical pinions 713, 743 illustrated in FIG. 20. Straight and even helical drive gears may be substituted for various purposes, with appropriate reconfiguration of the ring gears.

The selection of particular gearing forms should be appropriate to the different force levels, speeds, and other details of each application at hand. Suitable selection and design criteria for such gearing will be clear to those skilled in the art of mechanical design.

As will also be clear to such skilled artisans, it is not necessary to use gears at all. Rather, for some applications, a traction surface may be substituted for either or both of the gear sets 782 and 792; and mating drive wheels may be substituted for either or both of the pinions 713 and 743.

Suitable materials for both the traction surface at 782 or 792 and the drive wheels at 713 or 743 may include elastomers with various degrees of resiliency and tack. Generally smoother operation and finer adjustment increments will be available with such systems, though for relatively lower levels of transmitted force.

The motors 756 and 757 may be entirely concealed within the connection points 711, 741 or even within the toroidal bodies 721, 731; or they may be in plain view.

The motors may share the connection points 711, 741 with articles to be connected to the joint for mutual motion; or separate connection means for such articles may be provided along the peripheries of the toroids.

Furthermore, the motors may be electrical, air, or liquid motors. Their electrical, air or liquid drive power may be supplied through separate conductive wiring or tubing; or through the joint itself.

Here again, study of the drawings discussed so far will reveal that the inclusion of electrical or fluid provision of tractive surfaces and elements per FIG. 20. Consequently power or fluids, or both, to manipulate the joint itself may be supplied through the joint as well as power or fluids, or both, for other purposes.

FIG. 20 may also be taken as representing a joystick device in which the joint is manipulated manually. In such a device the elements 756 and 757 are not motors, but instead are electrical-signal or fluid-motion generators responsive to the motion of the joint.

Not only conventional electrical generators or alternators, but also modern electromechanical sensors (such as finely graduated radial-contact arrays) or electromagnetic angular-motion sensors or counters may be employed for optimum economy, and/or compatibility with modern digital-logic utilization circuits.

Figure 21:
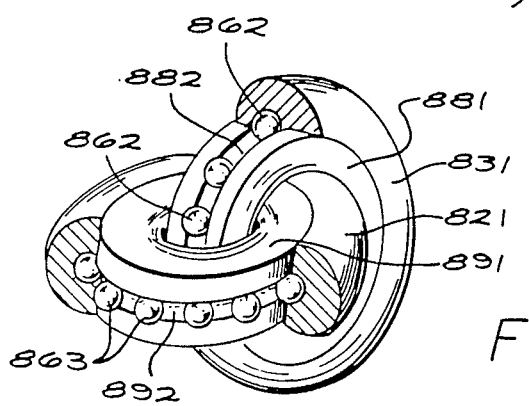

In some applications it may be desired to minimize operating friction of the joint. As shown in FIG. 21 an internal race 882, 892 may be provided within each toroid 821, 831; and balls or rollers 862, 863 may be disposed within the races 882, 892.

Such balls or rollers can be designed to suspend and carry the inner and outer parts 821/881, 831/891 of the toroids relative to one another in a rolling-friction mode. Such provision may be made in combination with flux or force transmission features already disclosed.

Conventional bearing styles may be substituted in one or both toroids. If bearings are desired in both halves of the joint, however, at least one must be assembled from two parts since the bearings must interlock.

As previously mentioned, for many applications of my invention it is not necessary to use complete rings or to form closely fitting grooves within the toroids. Alternative guide-and-follower sets are suggested in FIGS. 22 through 24.

Figure 22:
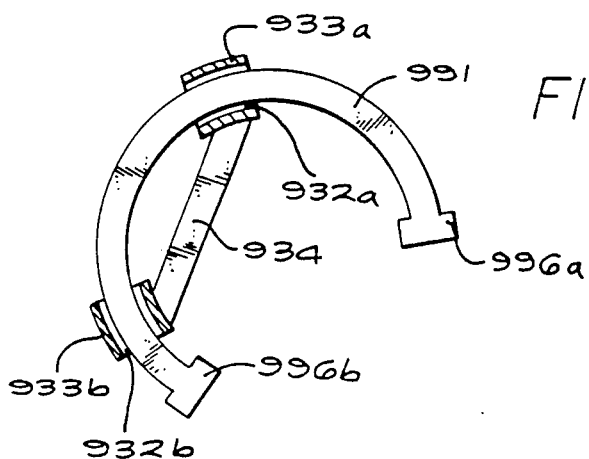

FIG. 22 shows a partial ring 991, fitted with a pair of sleeves 933a, 933b that ride along the partial ring at a fixed distance defined by a cross-member 934 within the ring. Bosses 996a, 996b at the ends of the ring 991 limit the travel of the sleeves 933a, 933b respectively.

Clearance spaces 932a, 932b between the sleeves 933a, 933b and the ring 991 may be lubricated or provided with bearings, or both. On the other hand the surfaces exposed in these spaces may have miniature detents or gripping elements to increase friction.

Figure 23:
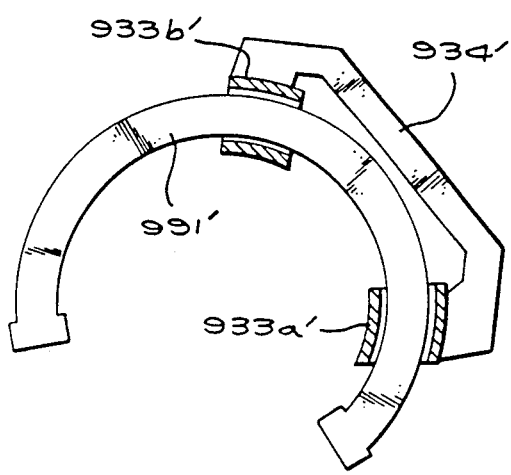

FIG. 23 shows a variant of the FIG. 23 system, in which the cross-member 934' is outside rather than inside the partial ring 991'. The same considerations as to surface characteristics apply here.

Figure 24:
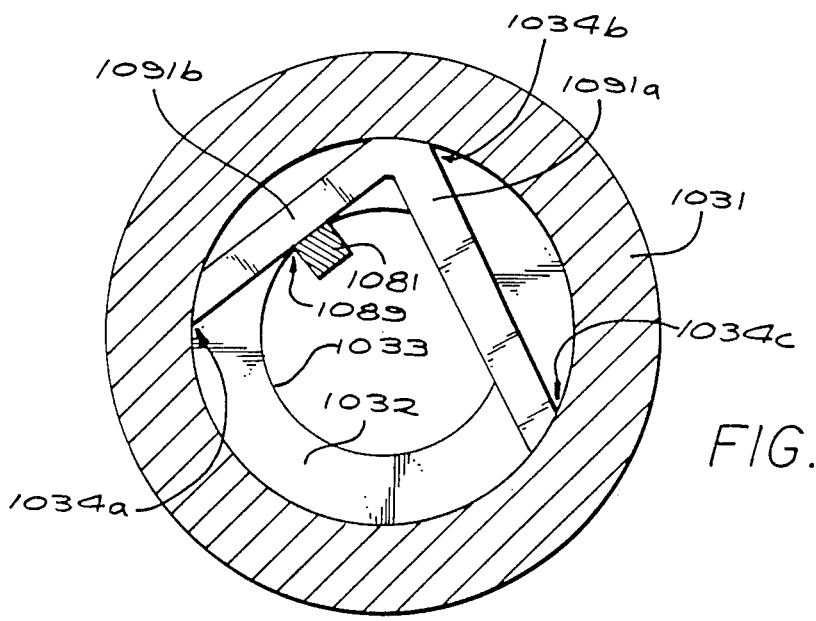

In either of FIGS. 23 or 24, the partial ring 991, 991' may be associated with and fixed to the outer structure such as toroid 421, 431 (FIGS. 8 through 13); while the follower assembly composed of sleeves 933a/933b, 933a'/933b' and crossbar 934, 934' may serve in lieu of the inner structure such as inner ring 481, 482. With equal effectiveness, however, the associations can be reversed.

FIG. 24 shows another kind of inner structure 1091a-b that can be substituted for either inner ring previously discussed. The inner structure shown here is simply two mutually angled bars 1091a and 1091b, strongly secured together at a fixed angle to form a corner.

Both ends of the inner structure 1091a-b of FIG. 24, and the corner as well, are formed to match, e. g., the peripheral surface of an interior groove 1032 formed along the periphery 1033 of the central aperture in a toroid 1031. Suitable interfaces 1034a, 1034b and 1034c are thus provided for relative motion of the inner structure 1091a-b and the outer toroidal body 1031.

Also shown in FIG. 24, in cross-section, is the corresponding inner follower member 1081 associated with another toroid (not illustrated). The two follower components 1081 and 1091b are secured together at a common area 1089 very generally coincident with the inner peripheries of the two toroids.

Flux or force transmission is thereby provided between the two inner followers 1081, 1091b—and thereby across the joint. These elements 1081, 1091b thus can provide all or any of the various intertoroid suspension and transmission functions previously described.

As shown in FIGS. 25a and 25b, relatively short partial-ring sections 981", 991" may be used within interlocked toroidal outer bodies to achieve some of the same functions. These structures are joined at a common area 989" along both inner peripheries, and may transmit force or flux between the halves of the joint as before, though of course over a narrower operating angular range.

FIG. 26 demonstrates that my invention, in its forms that include inner guide-and-follower structures of the types disclosed above, may be used with generally arch-shaped figures of arbitrary exterior form. Construction techniques for various embodiments, forms and variants of my invention are shown in the remaining drawings, which are self explanatory. All the dimensions of various versions of my invention can vary widely, from miniatures with minor diameters and central apertures of a small fraction of an inch to massive structures many feet across. It will be understood that the foregoing disclosure is intended to be merely exemplary, and not to limit the scope of the invention—which is to be determined by reference to the appended claims.

I claim:

1. A connective joint providing a rotational component of relative motion of two articles, and for use in transmitting a fluid current between the article, and comprising:

a pair of interlocked inner rings, each having an inner periphery; the two rings being fixed together at a common area along the inner peripheries of both rings;

two interlocked outer structures, each:
having a generally arched body surrounding an aperture,
having a minor cross-section, the minor cross-section of each outer structure being sized to fit through the aperture of the other outer structure,
defining a peripheral track about its aperture, and
being movably mounted by its track to ride on a respective one of the rings, whereby the interlocked outer structures are constrained to mutually arcuate compound trajectories; the body of each outer structure being small enough to fit through the aperture of the other outer structure, in at least part of said trajectories of the outer structures;

each structure having connection means for securing that structure to one of such two articles respectively;

intrastructure conduits, defined along a pair of paths within the structures respectively, each path being associated with one respective ring and track, for containing and conducting such fluid current along the paths respectively; and interstructure conduits, adjacent to or through the common area at which the rings are joined, for containing and conducting such fluid current between such two structures and in particular for transmitting such fluid current from the path associated with one ring to the path associated with the other ring, through or adjacent to the common area at which the particular members are joined.

2. The joint of claim 1, wherein:
the outer structures are substantially toroidal;
each aperture is generally central to its body, respectively, and is substantially circular; and
each minor cross-section is substantially circular.

3. A connective joint providing a rotational component of relative motion of a water-source device and a water-usage device, about an axis having an arbitrarily selectable orientation, and for use in transmitting a water flow between the source and discharge devices; and joint being incorporated integrally in a plumbing fixture, and comprising:

two interlocking structures, each having a minor cross-section and defining an aperture;
the minor cross-section of each toroid being small enough to fit through the aperture of the other structure; and the aperture of at least a particular one of the structures having an inner periphery;

an annular groove defined along the inner periphery of the aperture in said particular structure;

an inner ring movably disposed within the groove;

intrastructure transmission means, formed along a generally circular path associated with the inner ring and its corresponding groove within the particular structure, for conducting such water flow along the path;

interstructure transmission means, for conducting such water flow from the path to the other structure;

a water-source device for connection to a water supply;

a water-usage device; and connection means on one structure for securing that structure to the source device, and on the other structure for securing that structure to the usage device;

wherein said water-flow-conducting means carry water from the source device to the usage device.

4. The joint of claim 3, wherein:

each structure is generally toroidal;

each minor cross-section is substantially circular; and each aperture is substantially central to its structure, respectively, and is substantially circular.

5. The joint of claim 3, wherein:

the water-source device is a plumbing nipple; and the water-usage device is a water-discharge nozzle.

6. The joint of claim 3, wherein:

the water-source device is a plumbing nipple;

the water-usage device is a water-discharge nozzle; and the joint is incorporated integrally in a shower head.

7. The joint of claim 3, wherein:

the aperture of each structure respectively has an inner periphery;

an annular groove is defined along the inner periphery in each structure respectively;

an inner ring tis disposed within the groove of each structure respectively;

the two inner rings are fixed together at a junction region; and the interstructure transmission means are defined at the junction region.

8. The joint of claim 7, wherein:

each structure is generally toroidal;

each minor cross-section is substantially circular; and each aperture is substantially curved central to its structure, respectively, and is substantially circular.

9. A connective joint providing a rotational component of relative motion of two articles, and for use in transmitting a fluid current between the articles, and comprising:

a pair of interlocked structures, each:

having a generally arched body surrounding an aperture, having a minor cross-section and a major circumference, the minor cross-section of each structure being sized, along at least a segment of its major circumference, to fit through the aperture of the other structure, and being movably mounted so that the interlocked structures are constrained to mutually arcuate trajectories passing through each other;

each structure having connection means for securing that structure to one of such two articles respectively;

first means for conducting such fluid current between each of the structures and a respective one of such two articles;

second means for conducting such fluid current along paths within the structures respectively; and third means for conducting such fluid current along a path between the two structures.

10. The connective joint of claim 9, wherein:

all of the conducting means are operable even while the interlocked structures are moved along said mutually arcuate trajectories.

11. The joint of claim 9, further comprising:

a pair of interlocked inner rings, each having an inner periphery; the two rings being fixed together at a common area along the inner peripheries of both rings;

each of the structures being mounted to ride on a respective associated one of the rings;

wherein the third conducting means are defined adjacent to our through the common area at which the rings are joined.

12. The joint of claim 9, wherein:

each structure is generally toroidal;

each minor cross-section is substantially circular; and each aperture is generally central to its structure and is substantially circular.

* * * * *